United States Patent
Karol et al.

(10) Patent No.: US 12,057,727 B2
(45) Date of Patent: Aug. 6, 2024

(54) COEXISTENCE WITH WIRELESS POWER SYSTEM

(71) Applicant: Apple Inc., Cupertino, CA (US)

(72) Inventors: David A Karol, San Francisco, CA (US); Ali Navrozally, Cupertino, CA (US); Lior Ben-Yehoshua, San Francisco, CA (US); Zachary P Jasensky, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/079,271

(22) Filed: Dec. 12, 2022

(65) Prior Publication Data

US 2024/0097471 A1 Mar. 21, 2024

Related U.S. Application Data (60) Provisional application No. 63/403,919, filed on Sep. 6, 2022.

(51) Int. Cl.
*H02J 7/00* (2006.01)
*H02J 50/10* (2016.01)
*H02J 50/40* (2016.01)
*H04N 23/65* (2023.01)

(52) U.S. Cl.
CPC ........ *H02J 7/00712* (2020.01); *H02J 7/0048* (2020.01); *H02J 50/10* (2016.02); *H02J 50/40* (2016.02); *H04N 23/65* (2023.01)

(58) Field of Classification Search
CPC .. H02J 7/00; H02J 7/0012; H02J 50/10; H02J 50/40; H02J 7/0048; H04N 23/65
See application file for complete search history.

(56) References Cited

U.S. PATENT DOCUMENTS

| | | |
|---|---|---|
| 9,379,780 B2 | 6/2016 | Widmer |
| 10,164,469 B1 | 12/2018 | Jadidian et al. |
| 10,256,658 B2 | 4/2019 | Hyun et al. |
| 10,594,170 B2 | 3/2020 | Falkenburg et al. |
| 10,636,547 B2 | 4/2020 | Song et al. |
| 11,056,928 B2 | 7/2021 | Schwartz et al. |
| 11,218,016 B2 | 1/2022 | Ha et al. |
| 11,329,507 B2 | 5/2022 | Hall et al. |
| 2018/0287401 A1 | 10/2018 | Yoshikawa |
| 2019/0131827 A1 | 5/2019 | Johnston et al. |
| 2020/0220367 A1 | 7/2020 | Cho et al. |
| 2021/0359545 A1 | 11/2021 | Hall et al. |

FOREIGN PATENT DOCUMENTS

CN 105186644 A 12/2015

*Primary Examiner* — Robert L Deberadinis
(74) *Attorney, Agent, or Firm* — Treyz Law Group, P.C.; Tianyi He (57) ABSTRACT

A wireless power system may include an electronic device. The electronic device can include a camera and wireless power circuitry configured to perform a wireless power transfer operation with an external device. To promote coexistence of the camera with the wireless power circuitry, the electronic device can alter the wireless power transfer operation.

20 Claims, 4 Drawing Sheets

COEXISTENCE WITH WIRELESS POWER SYSTEM

This application claims the benefit of U.S. provisional patent application No. 63/403,919, filed on Sep. 6, 2022, which is hereby incorporated by reference herein in its entirety.

FIELD

This relates generally to power systems, and, more particularly, to wireless power systems for charging electronic devices.

BACKGROUND

In a wireless charging system, a wireless power transmitting device wirelessly transmits power to a wireless power receiving device. The wireless power receiving device has a wireless power transfer coil and rectifier circuitry. The coil receives alternating-current wireless power signals from the wireless power transmitting device. The rectifier circuitry converts the received signals into direct-current power.

SUMMARY

In one illustrative arrangement, control circuitry of the electronic device may be configured to determine whether use of the camera meets one or more criteria, and in response to determining use of the camera meets the one or more criteria, control the wireless power circuitry to pause the wireless power transfer operation. The one or more criteria may include a criterion that is met when the use of the camera is concurrent with the wireless power transfer operation, a criterion that is met when the state of charge of the battery is greater than a threshold state of charge level, a criterion that is met during execution of a camera application on the electronic device, a criterion that is met during use of the camera in a high-fidelity mode of operation, a criterion that is met when the camera is one of a plurality of cameras closest in proximity to the wireless power circuitry, and/or a criterion that is met when the presence of the external wireless power device is detected by a sensor.

DETAILED DESCRIPTION

A wireless power system may include one or more electronic devices that transmit wireless power, one or more electronic devices that receive wireless power, and one or more electronic devices that both transmit and receive wireless power. The wireless power system may include one or more portable electronic devices such as wristwatches, cellular telephones, tablet computers, laptop computers, and other portable electronic devices, may include electronic devices or equipment such as a wireless charging mat, a wireless charging puck, and an electronic device case (e.g., a case for a cellular telephone), and/or may include other types of electronic device or equipment. Each of these devices or equipment may transmit wireless power (e.g., be a wireless power transmitting device) and/or receive wireless power (e.g., be a wireless power transmitting device). A wireless power transmitting and receiving device configured to transmit and receive wireless power may sometimes also be referred to herein as a wireless power transmitting device when referring to its wireless power transmission characteristics or as a wireless power receiving device when referring to its wireless power reception characteristics.

The wireless power transmitting device may wirelessly transmit power to a wireless power receiving device. The wireless power receiving device may use power from the wireless power transmitting device for powering the device and for charging an internal battery. Wireless power is transmitted from the wireless power transmitting device to the wireless power receiving device using one or more wireless power transfer coils. The wireless power receiving device has one or more wireless power transfer coils coupled to rectifier circuitry that convert received wireless power signals into direct-current power.

Figure 1:
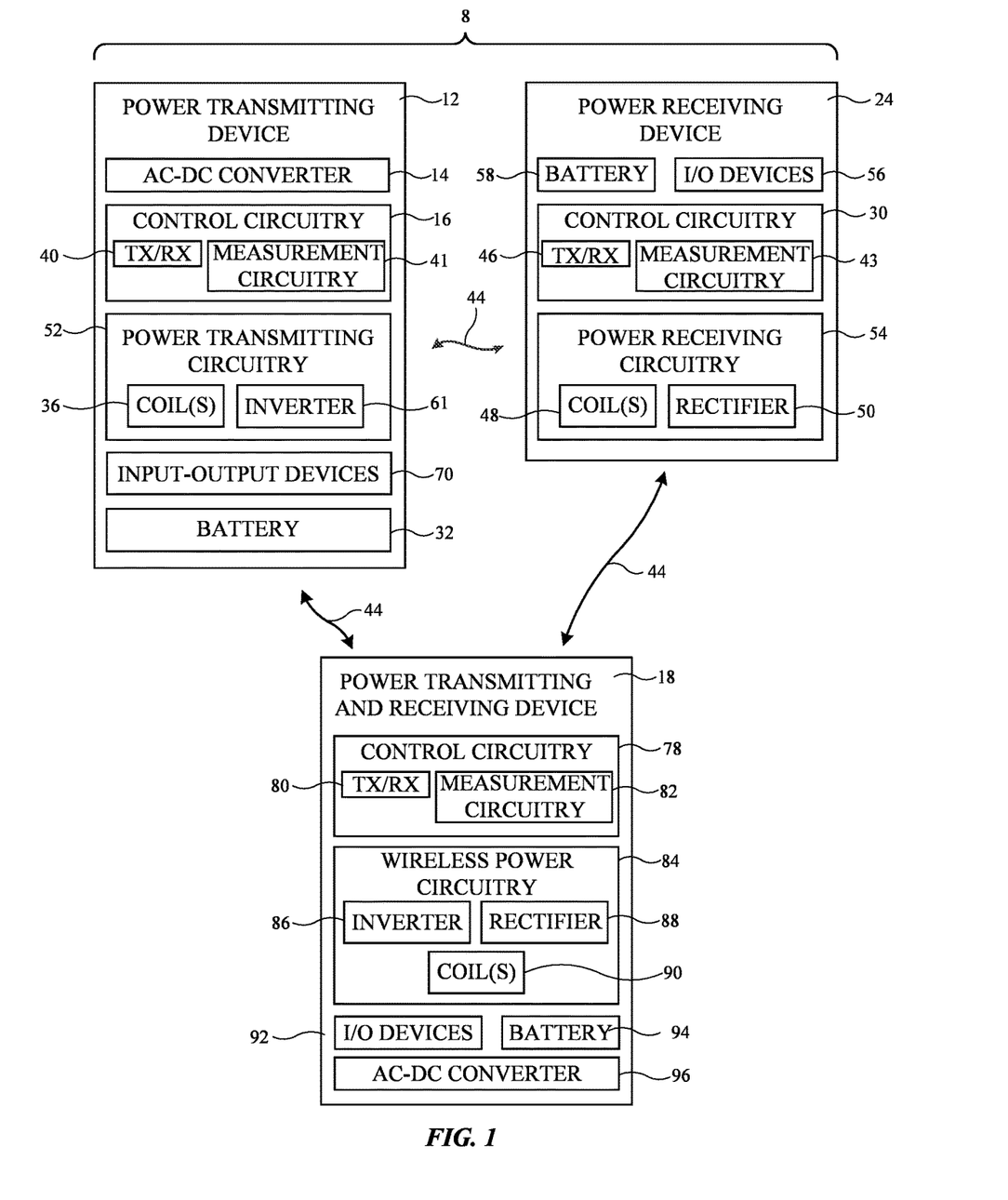
FIG. 1 is a schematic diagram of an illustrative wireless power system in accordance with some embodiments.

An illustrative wireless power system is shown in FIG. 1. As shown in FIG. 1, wireless power system 8 may include one or more wireless power transmitting devices such as wireless power transmitting device 12, one or more wireless power receiving devices such as wireless power receiving device 24, and one or more electronic devices capable of both transmitting and receiving wireless power (either simultaneously or at separate times) such as wireless power transmitting and receiving device 18. It should be understood that one or more of each type of device may be present in the wireless power system at any given time, with devices being added and removed from the system in a fluid manner. Additionally, one or more devices may switch between tethered (where the device receives power from a wall outlet or other power source) and untethered (where the device battery is used to power the device) states. The function of power transmitting and receiving device 18 may change depending upon the arrangement of the system at a given time. A power transmitting and receiving device may only transmit power in some scenarios, may only receive power in some scenarios, and may both transmit and receive power in some scenarios. The functionality of each device and inductive coupling between each device within the system may be updated as devices are added to and removed from the system.

Wireless power transmitting device 12 includes control circuitry 16. Wireless power receiving device 24 includes control circuitry 30. Wireless power transmitting and receiving device 18 includes control circuitry 78. Control circuitry in system 8 such as control circuitry 16, control circuitry 30, and control circuitry 78 is used in controlling the operation of system 8. This control circuitry may include processing circuitry or one or more processors associated with microprocessors, power management units, baseband processors, digital signal processors, microcontrollers, and/or application-specific integrated circuits with processing circuits. The processing circuitry implements desired control and communications features in devices 12, 18, and 24. For example, the processing circuitry may be used in selecting coils, determining power transmission levels, processing sensor data and other data to detect foreign objects and perform other tasks, processing user input, handling negotiations between devices 12, 18, and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in the control circuitry. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16, 30, and/or 78. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is connected to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a removable battery case are sometimes described herein as an example. Power receiving device 24 may be a portable electronic device such as a wrist watch, a cellular telephone, a laptop computer, a tablet computer, an accessory such as an earbud, may be a removable battery case, or may be other electronic equipment.

Power transmitting device 12 may be connected to a wall outlet (e.g., an alternating current power source), may have a battery 32 for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. For simplicity, an example is described herein of power transmitting device 12 transmitting wireless power to power receiving device 24. However, it should be understood that a power transmitting and receiving device 18 may substitute for one or both of the power transmitting device and the power receiving device during wireless power transfer operations.

Power transmitting circuitry 52 may have switching circuitry (e.g., inverter circuitry 61 formed from transistors) that is turned on and off based on control signals provided by control circuitry 16 to create AC current signals through one or more wireless power transfer coils such as wireless power transmitting coil(s) 36. These coil drive signals cause coil(s) 36 to transmit wireless power. Coils 36 may be arranged in a planar coil array or may be arranged to form a cluster of coils. In some arrangements, device 12 (e.g., a charging mat, puck, etc.) may have only a single coil. In other arrangements, device 12 may have multiple coils.

As the AC currents pass through one or more coils 36, alternating-current electromagnetic (e.g., magnetic) fields (wireless power signals 44) are produced that are received by one or more corresponding receiver coils such as coil(s) 48 in power receiving device 24. In other words, one or more of coils 36 are inductively coupled to one or more of coils 48. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-250 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display (screen) for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors such as infrared proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, motion, position, and/or orientation sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors.

Device 12 may also have one or more input-output devices 70 (e.g., input devices and/or output devices of the types described in connection with input-output devices 56). Device 18 may also have one or more input-output devices 92 (e.g., input devices and/or output devices of the types described in connection with input-output devices 56).

Device 12, device 18, and/or device 24 may communicate wirelessly using in-band or out-of-band communications. Device 12 may, for example, have wireless transceiver circuitry 40 that wirelessly transmits out-of-band signals (e.g., to device 18 and/or device 24) using an antenna. Wireless transceiver circuitry 40 may be used to wirelessly receive out-of-band signals from device 18 and/or 24 using the antenna. Device 24 may have wireless transceiver circuitry 46 that transmits out-of-band signals. Receiver circuitry in wireless transceiver 46 may use an antenna to receive out-of-band signals. Device 18 may have wireless transceiver circuitry 80 that transmits out-of-band signals. Receiver circuitry in wireless transceiver 80 may use an antenna to receive out-of-band signals. Wireless transceiver circuitry 40, 46, and 80 may also be used for in-band transmissions between devices 12, 24, and 18 using coils 36, 48, and 90. Frequency-shift keying (FSK) and/or amplitude-shift keying (ASK) may be used to convey in-band data between devices 12, 18, and 24. Power may be conveyed wirelessly during these FSK and ASK transmissions.

Control circuitry 16 has external object measurement circuitry 41 that may be used to detect external objects on the charging surface of the housing of device 12 (e.g., on the top of a charging mat or, if desired, to detect objects adjacent to the coupling surface of a charging puck). The charging surface may be formed by a planar outer surface of the upper housing wall of device 12 or may have other shapes (e.g., concave or convex shapes, etc.). In arrangements in which device 12 forms a charging puck, the charging puck may have a surface shape that mates with the shape of device 24. A puck or other device 12 may, if desired, have magnets that removably attach device 12 to device 24 (e.g., so that coil 48 aligns with coil 36 during wireless charging).

Circuitry 41 can detect foreign objects such as coils, paper clips, and other metallic objects and can detect the presence of wireless power receiving devices 24 (e.g., circuitry 41 can detect the presence of one or more coils 48 and/or magnetic core material associated with coils 48). During object detection and characterization operations, external object (foreign object) measurement circuitry 41 can be used to make measurements on coil(s) 36 such as Q-factor measurements, resonant frequency measurements, and/or inductance measurements that can indicate whether coil 48 is present and/or whether foreign objects such as coins or paperclips are present. Measurement circuitry 41 can also be used to make sensor measurements using a capacitive sensor, can be used to make temperature measurements, and/or can otherwise be used in gathering information indicative of whether a foreign object or other external object (e.g., device 18 and/or 24) is present on device 12.

In some configurations, the control circuitry of device 12 (e.g., circuitry 41 and/or other control circuitry 16) can implement a power counting foreign object detection scheme. With this approach, device 12 receives information from device 24 (e.g., via in-band communications) indicating the amount of power that device 24 is wirelessly receiving (e.g., 4.5 W). Device 12 knows how much power (e.g., 5.0 W) is being transmitted (e.g., because device 12 knows the magnitude of the signal being used to drive coil 36 from inverter 61). By comparing the transmitted power (e.g., 5.0 W) to the received power (e.g., 4.5 W), device 12 can estimate the amount of wireless power that is being dissipated due to eddy currents flowing in a foreign object. If the dissipated power (e.g., 0.5 W in this example) is more than a predetermined threshold amount or if the efficiency of the wireless power transfer process is lower than expected, device 12 can conclude that a foreign object is present. Power counting techniques such as these may be used in conjunction with capacitive sensing foreign object detection techniques and/or other external object measurement operations performed using circuitry 41.

In some embodiments, measurement circuitry 41 of control circuitry 16 contains signal generator circuitry (e.g., oscillator circuitry for generating AC probe signals at one or more probe frequencies, a pulse generator that can create impulses so that impulse responses can be measured) and/or uses the transmission of wireless power signals from device 12 to energize the coils in system 8. Circuitry 41 may also include circuits (e.g., analog-to-digital converter circuits, filters, analog combiners, digital processing circuitry, etc.) to measure the response of system 8.

Power transmitting and receiving device 18 may be a portable electronic device such as a wrist watch, a cellular telephone, a laptop computer, a tablet computer, an accessory such as an earbud, may be a wireless charging mat or puck that is connected to a power adapter (e.g., an AC to USB power adapter) or other equipment by a cable, may be equipment that has been incorporated into furniture, a vehicle, or other system, may be a removable battery case, or may be other electronic equipment. Power transmitting and receiving device 18 is capable of both transmitting and receiving wireless power. Power transmitting and receiving device 18 therefore may include power transmitting components (e.g., of the same type described in connection with power transmitting device 12). Power transmitting and receiving device 18 may also include power receiving components (e.g., of the same type described in connection with power receiving device 24).

Power transmitting and receiving device 18 may have an alternating-current (AC) to direct-current (DC) power converter such as AC-DC power converter 96 for converting AC power from a wall outlet or other power source into DC power. DC power may be used to power control circuitry 78. Control circuitry 78 includes wireless transceiver circuitry 80 for in-band communications (using coils 90) and/or out-of-band communications (using an antenna). Control circuitry 78 may also include measurement circuitry 82 (e.g., measurement circuitry of the type described in connection with measurement circuitry 41).

Wireless power circuitry 84 in device 18 may include both inverter circuitry 86 and rectifier circuitry 88. Inverter circuitry 86 (e.g., formed from transistors) may be turned on and off based on control signals provided by control circuitry 78 to create AC current signals through one or more coils such as coil(s) 90. These coil drive signals cause coil(s) 90 to transmit wireless power. Coils 90 may be arranged in a planar coil array or may be arranged to form a cluster of coils. In some arrangements, device 18 may have only a single coil. In other arrangements, device 18 may have multiple coils (e.g., two or more coils, 5-10 coils, at least 10 coils, 10-30 coils, fewer than 35 coils, fewer than 25 coils, or other suitable number of coils).

As the AC currents pass through one or more coils 90, alternating-current electromagnetic (e.g., magnetic) fields (wireless power signals 44) are produced that are received by one or more corresponding receiver coils such as coil(s) 48 in power receiving device 24. In other words, one or more of coils 90 may be inductively coupled to one or more of coils 48.

Power transmitting and receiving device 18 may also receive wireless power (e.g., from power transmitting device 12). Coil(s) 90 may receive alternating-current electromagnetic fields from transmitting coils 36, resulting in corresponding alternating-current currents in coil(s) 90. Rectifier circuitry such as rectifier circuitry 88, which contains rectifying components such as synchronous rectification metal-oxide-semiconductor transistors arranged in a bridge network, converts received AC signals (received alternating-current signals associated with electromagnetic signals 44) from one or more coils 90 into DC voltage signals for powering device 18. The DC voltage produced by rectifier circuitry 88 can be used in charging a battery such as battery 94 and can be used in powering other components in device 18.

The depiction of alternating-electromagnetic fields between each type of device in FIG. 1 is merely illustrative (to show the type of inductive coupling that is possible). In practice, alternating-electromagnetic fields will only be conveyed between select devices within the system. In some scenarios, power transmitting and receiving device 18 only transmits wireless power (e.g., using inverter 86 and coil(s) 90). In some scenarios, power transmitting and receiving device 18 only receives wireless power (e.g., using rectifier 88 and coil(s) 90).

Figure 2:
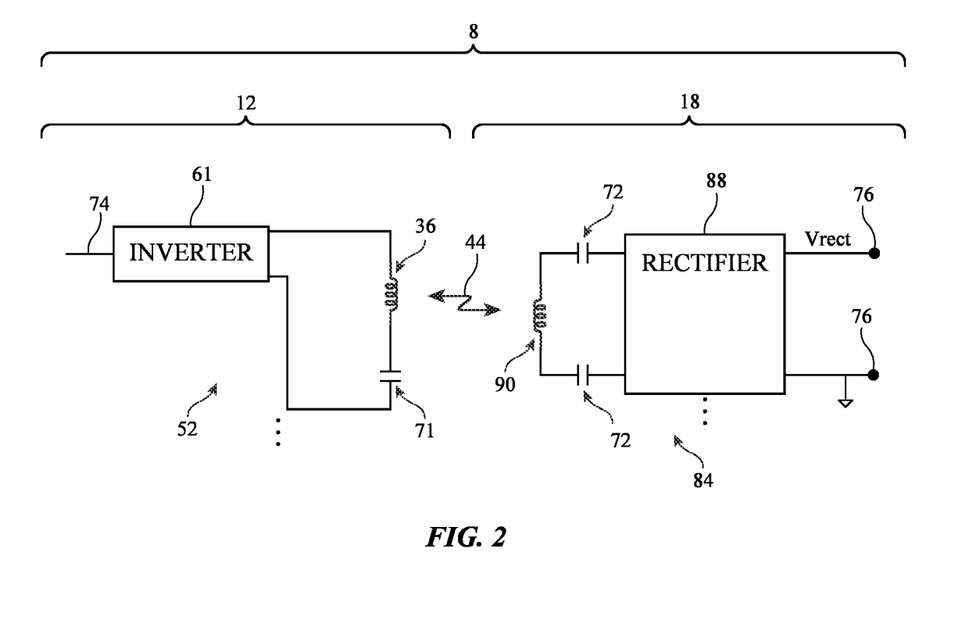
FIG. 2 is a circuit diagram of illustrative wireless power transmitting and receiving circuitry in accordance with some embodiments.

FIG. 2 is a circuit diagram of illustrative wireless charging circuitry for system 8. Wireless charging circuitry of a power transmitting device 12 and a power receiving portion in the wireless power circuitry of power transmitting and receiving device 18 is shown in the example of FIG. 2. However, it should be understood that device 18 may have the corresponding components for power transmission and may be used in place of device 12 and used to transmit wireless power to the wireless power receiving circuitry of a power receiving device 24 (in place of device 18 as depicted in FIG. 2).

As shown in FIG. 2, wireless power circuitry 52 may include inverter circuitry such as one or more inverters 61 or other drive circuitry that produces wireless power signals that are transmitted through an output circuit that includes one or more coils 36 and capacitors such as capacitor 71. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically. For example, a pair of inverters 61 may produce output signals in phase or out of phase (e.g., 180 degrees out of phase).

The application of drive signals using inverter(s) 61 (e.g., transistors or other switches in circuitry 52) causes the output circuits formed from selected coils 36 and capacitors 71 to produce alternating-current electromagnetic fields (signals 44) that are received by wireless power circuitry 84 using a wireless power receiving circuit formed from one or more coils 90 and one or more capacitors 72 in device 18.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 18. Rectifier circuitry 88 is coupled to one or more coils 90 and converts received power from AC to DC and supplies a corresponding direct current output voltage Vrect across rectifier output terminals 76 for powering load circuitry in device 18 (e.g., for charging battery 94, for powering a display and/or other input-output devices 92, and/or for powering other components). A single coil 90 or multiple coils 90 may be included in device 18.

As previously mentioned, in-band transmissions using coils 36 and 90 may be used to convey (e.g., transmit and receive) information between devices 12 and 18. With one illustrative configuration, frequency-shift keying (FSK) is used to transmit in-band data from device 12 to device 18 and amplitude-shift keying (ASK) is used to transmit in-band data from device 18 to device 12. In other words, a device transmitting wireless power may use FSK to transmit in-band data to a device receiving wireless power (regardless of whether either device is a dedicated power transmitting/receiving device 12/24 or a power receiving and transmitting device 18). A device receiving wireless power may use ASK to transmit in-band data to a device transmitting wireless power (regardless of whether either device is a dedicated power transmitting/receiving device 12/24 or a power receiving and transmitting device 18).

Power may be conveyed wirelessly from device 12 to device 18 during these FSK and ASK transmissions. While power transmitting circuitry 52 is driving AC signals into one or more of coils 36 to produce signals 44 at the power transmission frequency, wireless transceiver circuitry 40 may use FSK modulation to modulate the power transmission frequency of the driving AC signals and thereby modulate the frequency of signals 44. In device 18, coil 90 is used to receive signals 44. Wireless power circuitry 84 uses the received signals on coil 90 and rectifier 88 to produce DC power. At the same time, wireless transceiver circuitry 80 monitors the frequency of the AC signal passing through coil(s) 90 and uses FSK demodulation to extract the transmitted in-band data from signals 44. This approach allows FSK data (e.g., FSK data packets) to be transmitted in-band from device 12 to device 18 with coils 36 and 90 while power is simultaneously being wirelessly conveyed from device 12 to device 18 using coils 36 and 90.

In-band communications between device 18 and device 12 may use ASK modulation and demodulation techniques. Wireless transceiver circuitry 80 transmits in-band data to device 12 by using a switch (e.g., one or more transistors in transceiver 80 that are coupled coil 90) to modulate the impedance of the power receiving portion of wireless power circuitry 84 (e.g., coil 90). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 80. The use of ASK communications allows ASK data bits (e.g., ASK data packets) to be transmitted in-band from device 18 to device 12 with coils 90 and 36 while power is simultaneously being wirelessly conveyed from device 12 to device 18 using coils 36 and 90.

The example of FSK modulation being used to convey in-band data from power transmitting device 12 to power receiving device 18 and ASK modulation being used to convey in-band data from power receiving device 18 to power transmitting device 12 is merely illustrative. In general, any desired communication techniques may be used to convey information from power transmitting device 12 to power receiving device 18 and from power receiving device 18 to power transmitting device 12. In general, wireless power may simultaneously be conveyed between devices during in-band communications (using ASK or FSK).

The power transmission frequency used for transmission of wireless power may be, for example, a predetermined frequency of about 128 kHz, at least 80 kHz, at least 100 kHz, between 100 kHz and 205 kHz, less than 500 kHz, less than 300 kHz, about 326 kHz, about 360 kHz, or other suitable wireless power frequency. In some configurations, the power transmission frequency may be negotiated in communications between devices 12 and 18. In other configurations, the power transmission frequency may be fixed.

It has been described that power may be simultaneously conveyed between devices while using in-band communication for data transmission between the devices. In other words, in some examples in-band communications may rely on modulation of the power transmission signal (e.g., modulating the power transmission frequency or modulating amplitude of a signal at the power transmission frequency). However, other communication techniques may be used that do not rely on modulation of the power transmission signals. For example, signals (sometimes referred to as in-band signals) may be conveyed between coils in the system at a frequency that is different than the power transmission frequency. Signals (at the same frequency or a different frequency than the power transmission frequency) that are conveyed using the coils (e.g., coils 36, 48, and 90) may be considered in-band signals.

Moreover, it should be noted that in-band communication may occur between devices before the devices agree upon a power transfer rate, power transmission frequency, etc. After initial detection and inductive coupling, devices may go through a handshake process to determine compatibility, negotiate power transfer frequency, negotiate power transfer rate, etc. During this process, in-band communication may involve FSK and/or ASK modulation of signals at the power transmission frequency. Therefore, wireless power is transmitted during this process. This is advantageous as it allows the devices to complete the handshake process even if the power receiving device has little or no remaining battery power. This transmission of wireless power during in-band communications may occur during the handshake process even if, ultimately, the negotiations between the devices result in no sustained transmission of wireless power (e.g., even if the devices do not enter a dedicated power transfer phase).

The aforementioned FSK and ASK modulation and demodulation techniques may be used to transmit data packets between any two devices within system 8. Each data packet may include numerous data bits (sometimes referred to as bits). The data bits may be grouped into bytes, with each byte including any desired number of bits (e.g., 8 bits).

In one illustrative configuration sometimes described herein as an example, a device such as device 18 in wireless power system 8 may be coupled (e.g., physically coupled) to a removable accessory such as a case (e.g., removably coupled or attached to device 18). The case may have wireless charging functionality (e.g., the case may be capable of receiving and/or transmitting wireless power). When device 18 is physically coupled to the removable accessory and the removable accessory has wireless charging functionality, device 18 and the removable accessory may also be inductively coupled. In particular, when inductively coupled, device 18 may receive wireless power from the removable accessory and/or may transmit wireless power to the removable accessory (e.g., at different times). When device 18 performs these wireless power transfer operations with the removable accessory (or with other power transmitting and/or receiving devices), other components and their operations in device 18 may be adversely affected by the performance of these wireless power transfer operations.

Figure 3:
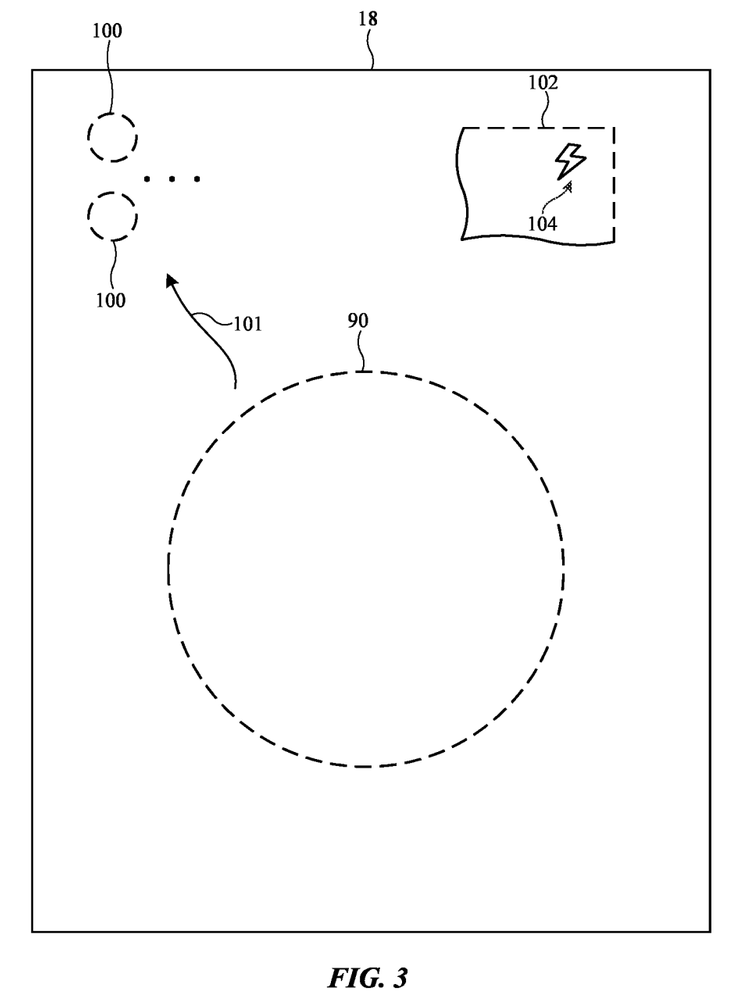
FIG. 3 is a diagram of an illustrative electronic device having wireless power circuitry and a camera system in accordance with some embodiments.

In particular, FIG. 3 is a diagram of an illustrative device such as device 18 having a camera system and wireless power circuitry that may be in operation at the same time. In the example of FIG. 3, device 18 may include wireless power circuitry 84 (FIG. 1) containing coil(s) 90 and one or more cameras 100 (e.g., image sensors) in the camera system. Wireless power circuitry 84 may use coil 90 to perform wireless power transfer operations. As examples of the wireless power transfer operations, inverter 86 in the power transmission portion of wireless power circuitry 84 may cause coil 90 to transmit wireless power to external equipment such as a removable accessory, a portable electronic device, or other power receiving devices 24, and/or coil 90 may receive wireless power signals from external equipment such as a removable accessory, a wireless charging puck, a portable electronic device, or other power transmitting devices 12 (and convert the received wireless power signals into DC voltage signals using rectifier 88) to charge battery 94 and/or supply other components in device 18 with power.

In particular, to perform the wireless power transfer operations, the wireless power circuitry of the external equipment (e.g., a wireless power coil) may overlap coil 90 of device 18. If desired, the external equipment may be physically coupled to device 18 to facilitate inductive charging.

As shown in FIG. 3, device 18 may also include a display such as display 102. Display 102 may be used to provide a visual output (e.g., images) to a user. In particular, while performing the wireless power transfer operations, display 102 may display an icon indicative of power transfer operations such as icon 104, sometimes called a charging icon.

The operation of coil 90 may produce an electromagnetic field which can cause electromagnetic interference 101 to the operation of camera 100. As an example, one or more output produced using camera 100, such as video or images, may exhibit artifacts resulting from fixed pattern noise (e.g., row-wise fixed pattern noise). These types of artifacts may be most noticeable during low light camera operations, for example, due to a lower signal-to-noise ratio.

Figure 4:
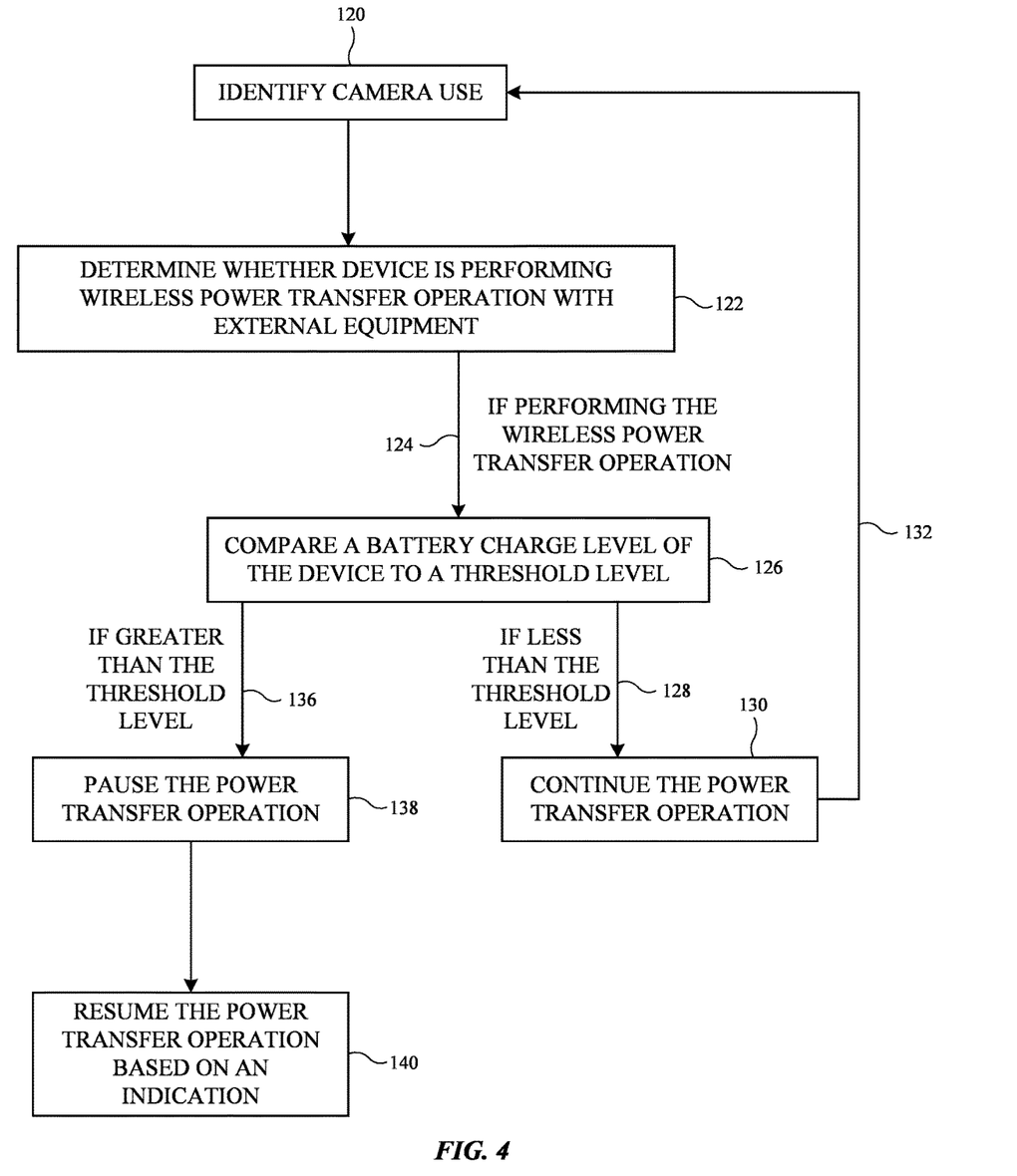
FIG. 4 is a flowchart of illustrative operations for operating wireless power circuitry in conjunction with camera use in accordance with some embodiments.

Accordingly, it may be desirable to improve camera system coexistence with wireless power circuitries. FIG. 4 shows a flowchart of illustrative operations performed by an electronic device such as device 18 to enable coexistence of a camera system and wireless power circuitry (e.g., mitigate this type of electromagnetic interference to camera operation). In particular, one or more of (e.g., all) operations described in connection with FIG. 4 may be performed by control circuitry 78 in device 18. As an example, software code for performing these operations may be stored as instructions in memory or other non-transitory computer-readable storage media (e.g., tangible computer-readable storage media) in control circuitry 78. These instructions may be executed by one or more processors in control circuitry 78 to perform these operations. If desired, other components in device 18 may perform one or more of these operations in conjunction with or instead of control circuitry 78.

As shown in FIG. 4, in block 120, device 18 (e.g., control circuitry 78) may identify or otherwise determine use of one or more cameras 100 in device 18. As an example, control circuitry 78 may receive a signal indicative of (user) input that causes a camera application (e.g., any application on which camera 100 is expected to capture one or more images or video) to execute. If desired, control circuitry 78, in block 120, may specifically identify one or more camera use conditions such as conditions most susceptible to electromagnetic interference (e.g., low-light image or video capture or generally a low light mode of camera operation, operation in a high-fidelity image or video capture mode, etc.) and may only proceed to block 122 if these camera use conditions are met. On devices having more than one camera, the camera use conditions include activation of camera operation involving one or more particular cameras, such as the activation of a wide-angle mode that uses output from a wide-angle camera that is positioned closer to coil 90. If desired, control circuitry 78, in block 120, may determine whether one or more specific cameras 100 (e.g., those closest to coil 90, operable in a low-light or high-fidelity mode, etc.) are in use (regardless of whether or not other cameras in the camera system are in use).

In block 122, device 18 (e.g., control circuitry 78) may determine whether wireless power circuitry 84 is performing any wireless power transfer (e.g., transmission or reception) operation with external equipment (e.g., a removable case for device 18 that is physically coupled to device 18, a charging puck coupled to device 18, any power transmitting device 12, any power receiving device 24, any other power transmitting and receiving device 18, etc.). As examples, control circuitry 78 may determine whether wireless power transfer is being performed based on the states of inverter 86 and/or rectifier 88 in wireless power circuitry 84, based on in-band and/or out-of-band communications using wireless transceiver 80 in control circuitry 78, based on sensor data gathered by one or more sensors such as magnetic sensors, proximity sensors, etc. indicative of the physical coupling to the external equipment (e.g., via a magnetic force biasing the external equipment to device 18), and/or based on any other information indicative of wireless power transfer.

If device 18 is performing wireless power transfer using wireless power circuitry 84, processing may proceed via path 124 to block 126. Otherwise, coexistence operations for the camera system and wireless power system may end because the source for the electromagnetic interference is not in active (wireless power transfer) operation.

In block 126, device 18 (e.g., control circuitry 78) may compare a battery charge level of device 18 (e.g., a state of charge of battery 94 in device 18) to a threshold (state of charge) level. As examples, the threshold state of charge level may be 25%, 20%, 15%, 10%, a threshold level less than 50%, a threshold level greater than 5%, etc. In particular, in scenarios in which device 18 is the power receiving device (e.g., receives wireless power from the external equipment serving as the power transmitting device), this threshold state of charge level may reflect a lower limit of a battery charge level at which extending wireless charging is preferrable. If desired, this threshold state of charge level may be dynamic and/or adjustable (e.g., based on user input).

At block 126, if the battery charge level is less than the threshold level, processing proceeds via path 128 to block 130. In block 130, device 18 (e.g., control circuitry 78) controls wireless power circuitry 84 to continue the wireless power transfer operation. After a period of time, processing may return from block 130 to block 120 via path 132, such that control circuitry 78 may reassess, through the operations of blocks 120, 122, and 126, whether wireless power transfer operations should continue, or if processing should instead proceed to block 138.

At block 126, if the battery charge level is greater than the threshold level, processing proceeds via path 136 to block 138. In block 138, device 18 (e.g., control circuitry 78) controls wireless power circuitry 84 to pause the wireless power transfer operation. In some examples, wireless power circuitry 84 may modulate the wireless power signals received at coil 90. The modulation changes the wireless power signal in a way that can be seen by the wireless power transmitting device. Thus, modulation that produces a certain effect, including the use of ASK or FSK, can be used to communicate the intent to pause. It is noted that to the extent that any implementation of this wireless charging technology involves the use of ASK and/or FSK to communicate information, such as personally identifiable information between wireless transceivers, implementers should follow privacy policies and practices that are generally recognized as meeting or exceeding industry or governmental requirements for maintaining the privacy of users. If desired, during this pause in the wireless power transfer operation, device 18 may still communicate with the external equipment. As an example, device 18 (e.g., wireless power circuitry 84) and the external equipment (e.g., the wireless power circuitry of the external equipment) may each issue pings to and/or detect pings from each other, to indicate mutual presence, during this pause.

Following this pause, control circuitry 78 may receive an indication that the power transfer operation should resume. The indication may be based on an expiry of a timer, a closing of the camera application, other information indicating that camera 100 is no longer in use, an indication that a battery charge level of battery 94 has fallen below a threshold level (e.g., a determination based on block 126). In block 140, based on the indication, control circuitry 78 may control wireless power circuitry 84 to resume the power transfer operation. If desired, block 126 may include hysteresis (e.g., a 5% state of charge hysteresis for the threshold state of charge level) to prevent fluctuations between pausing and continuing the wireless power transfer operation when the state of charge of battery 94 is near the threshold level.

If desired, the issuance and detection of pings (during the period of pause) may be used to resume the power transfer operation. In one illustrative example, device 18 receives wireless power signals from power transmitting device 12, which is serving as the external equipment described in connection with FIG. 4. In this example, in block 138, control circuitry 78 uses wireless transceiver 80 to inform wireless transceiver 40 to pause the transmission of wireless power signals from device 12 to device 18. While the transmission of wireless power signals is paused, device 12 may still issue periodic pings using coil 36, which is received by coil 90 of device 18. If desired, the pings can occur via out-of-band communications. Device 18 detects these periodic pings as indicating that wireless transceiver 40 (and therefore the power transfer circuitry of the external equipment) remains coupled and is ready to resume wireless power transfer. In scenarios in which the periodic pings are absent (e.g., are not detected by device 18), device 18 may determine that the power transfer circuitry of the external equipment may no longer be present and/or be ready to resume wireless power transfer. When device 18 detects the camera identified in block 120 is no longer in use or that the charge level of battery 94 has fallen below a threshold level, device 18 responds to one or more of these periodic pings, thereby informing wireless transceiver 40 to resume the transmission of wireless power signals to device 18 to charge battery 94. The response may include modulation of the incoming ping, introduction of an additional ping that can be sensed by coil 36, or other suitable manner. In this way, control circuitry 78 may resume (e.g., cause the resumption of) the wireless power transfer operation in block 140.

In some illustrative configurations for operation, device 18 may communicate with the wireless power transfer external equipment to generally alter the power transfer operation therebetween. As an example, device 18 and the wireless power transfer external equipment may alter the power transfer operation by reducing a voltage, current, wattage, duty cycle, and/or other signal characteristics used to produce the wireless power signals for the power transfer operation in order to promote coexistence with an adjacent camera. In configurations in which device 18 serves as the power receiving device, device 18 may provide a control signal or ping, or otherwise communicate an indication to the wireless power transmitting external equipment to lower the voltage, current, wattage, duty cycle, and/or other signal characteristics used to produce the wireless power signals. Once device 18 determines that the original power transfer operation can resume (e.g., if the battery charge level is less than the threshold level at block 126, camera operations have ceased, etc.), the reduced voltage, current, duty cycle, and/or other signal characteristics used to produce the lower-power wireless power signals may again be updated to the original voltage, current, wattage, duty cycle, and/or other signal characteristics used to produce the wireless power signals. In configurations in which device 18 serves as the power receiving device, device 18 may provide a control signal or ping, or otherwise communicate an indication to the wireless power transmitting external equipment to normalize the voltage, current, wattage, duty cycle, and/or other signal characteristics used to produce the wireless power signals.

In some illustrative configurations for operation, device 18 (e.g., by communicating an indication to the external equipment) may pause or alter the power transfer operation during only certain portions of camera operations. In particular, when a camera is in use by a camera application or other application, the camera may first be used in providing a digital view finder and may thereafter be used to capture image data for storage (e.g., once the appropriate scene has been found by or is aligned with the digital view finder). As such, the device 18 (e.g., by communicating an indication to the external equipment) may pause or alter the power transfer operation during the period of time in which the image data for storage is captured and stored and not during the period of time in which the camera is used to provide the digital view finder. In some examples, device 18 affects wireless power transfer when a user issues a shutter or record command while the digital view finder is active. Put more generally, the pause or alteration of the power transfer operation may coincide or overlap (temporally) with the generation, readout, and/or other operations performed to obtain the image data for storage, and if desired, may not occur during camera operations not associated with obtaining image data for storage. As an example, the power transfer operation may be paused or occur with a lower voltage or current for generating the wireless power signals during the camera operations performed to obtain the image data for storage (e.g., thereby enabling the storage of a higher-quality image or video) and may resume or occur with a higher voltage or current for generating the wireless power signals during the camera operations not associated with obtaining image data for storage.

Although the examples of FIG. 4 have been provided in the context of device 12 acting as a wireless power transmitter and device 18 acting as a power receiver, it is noted that device 18 is capable of transmitting wireless power in some configurations. In these scenarios, the threshold state of charge level as described in block 126 may be a level at which the receiving device is considered to be at a high state of charge), and device 18 proceed to pause wireless power transfer responsive to use of a camera at device 18 to promote coexistence.

Although the examples of FIG. 4 have been provided in the context of device 12 pausing wireless power transfer under some usage conditions of device 18, it is noted that device 12 may instead reduce the power level of the wireless transmission.

The foregoing is merely illustrative and various modifications can be made to the described embodiments. The foregoing embodiments may be implemented individually or in any combination.

What is claimed is:

1. An electronic device comprising:
a camera;
wireless power circuitry having a wireless power transfer coil, the wireless power circuitry configured to perform a wireless power transfer operation comprising transferring wireless power signals using the wireless power transfer coil; and
control circuitry configured to:
determine whether a use of the camera meets one or more criteria comprising a criterion that is met when the use of the camera is concurrent with the wireless power transfer operation; and
in response to determining that the use of the camera meets the one or more criteria, control the wireless power circuitry to pause the wireless power transfer operation.

2. The electronic device defined in claim 1 further comprising:
a battery coupled to the wireless power circuitry, wherein the wireless power transfer operation comprises charging the battery using wireless power signals received by the wireless power transfer coil.

3. The electronic device defined in claim 2, wherein the battery has a state of charge and wherein the one or more criteria comprises a criterion that is met when the state of charge of the battery is greater than a threshold state of charge level.

4. The electronic device defined in claim 3, wherein the control circuitry is configured to control the wireless power circuitry to resume the wireless power transfer operation by transmitting a signal using the wireless power transfer coil, in accordance with determining that the state of charge of the battery is less than the threshold state of charge level.

5. The electronic device defined in claim 1, wherein the one or more criteria includes a criterion that is met during execution of a camera application on the electronic device.

6. The electronic device defined in claim 5, wherein the one or more criteria includes a criterion that is met during a use of the camera in a high-fidelity mode of operation.

7. The electronic device defined in claim 1, wherein the one or more criteria includes a criterion that is met when the camera is one of a plurality of cameras closest in proximity to the wireless power circuitry.

8. The electronic device defined in claim 1 further comprising:
a sensor configured to detect a presence of external wireless power equipment with which the electronic device engages in the wireless power transfer operation.

9. The electronic device defined in claim 8, wherein the one or more criteria comprises a criterion that is met when the presence of the external wireless power equipment is detected by the sensor.

10. The electronic device defined in claim 9, wherein the external wireless power equipment comprises an electronic device accessory configured to be removably attached to the electronic device.

11. The electronic device defined in claim 8, wherein the electronic device comprises a wireless power receiving functionality and wherein the wireless power transfer operation comprises a wireless receiving operation in which the electronic device receives wireless power.

12. The electronic device defined in claim 8, wherein the electronic device comprises a wireless power transmitting functionality and wherein the wireless power transfer operation comprises a wireless transmitting operation in which the electronic device transmits wireless power.

13. Non-transitory computer-readable storage media comprising computer-executable instructions that, when executed by one or more processors for a wireless power transfer system, cause the one or more processors to:
identify a use of a camera in an electronic device concurrent with a wireless power transfer operation performed by the electronic device;
compare a state of charge of a battery in the electronic device to a threshold state of charge level; and
pause the wireless power transfer operation based at least in part on the identified use of the camera and the comparison of the state of charge of the battery to the threshold state of charge level.

14. The non-transitory computer-readable storage media defined in claim 13 further comprising computer-executable instructions that, when executed by the one or more processors for the wireless power transfer system, cause the one or more processors to:
during the pause of the wireless power transfer operation, detect periodic pings from external equipment with which the wireless power transfer operation is performed.

15. The non-transitory computer-readable storage media defined in claim 14 further comprising computer-executable instructions that, when executed by the one or more processors for the wireless power transfer system, cause the one or more processors to:
respond to a ping in the periodic pings from the external equipment to resume the wireless power transfer operation after the pause of the wireless power transfer operation.

16. The non-transitory computer-readable storage media defined in claim 13, wherein the wireless power transfer operation is a wireless power receiving operation during which the electronic device receives wireless power and wherein the pause of the wireless power transfer operation is responsive to the state of charge of the battery being greater than the threshold state of charge level.

17. The non-transitory computer-readable storage media defined in claim 13 further comprising computer-executable instructions that, when executed by the one or more processors for the wireless power transfer system, cause the one or more processors to:
detect, using a sensor, a presence of external equipment with which the wireless power transfer operation is performed, wherein the identification of the use of the camera concurrent with the wireless power transfer operation is at least partly based on the detected presence of the external equipment.

18. An electronic device configured to receive wireless power from a removable accessory, the electronic device comprising:
a camera;
a battery;
wireless power circuitry having a wireless power transfer coil, the wireless power circuitry configured to receive wireless power signals from the removable accessory using the wireless power transfer coil to charge the battery; and
control circuitry configured to:
determine whether a use of the camera meets one or more criteria comprising a criterion that is met when a state of charge of the battery is greater than a threshold state of charge level; and
in response to determining that the use of the camera meets the one or more criteria, control the wireless power circuitry to pause the wireless power transfer operation.

19. The electronic device defined in claim 18, wherein the one or more criteria comprises a criterion that is met when the use of the camera is concurrent with the reception of the wireless power signals.

20. The electronic device defined in claim 18, wherein the one or more criteria comprises a criterion that is met when the camera operates in a wide-angle mode or a low-light mode.

* * * * *